United States Patent [19]

Evans

[11] Patent Number: 4,465,747

[45] Date of Patent: Aug. 14, 1984

[54] ALKALI METAL OR ALKALINE EARTH METAL COMPOUND ADDITIVE FOR MANGANESE DIOXIDE-CONTAINING NONAQUEOUS CELLS

[75] Inventor: William P. Evans, Rocky River, Ohio

[73] Assignee: Union Carbide Corporation, Danbury, Conn.

[21] Appl. No.: 509,131

[22] Filed: Jun. 29, 1983

[51] Int. Cl.$^3$ ............................................. H01M 4/50
[52] U.S. Cl. .................................... 429/194; 429/224
[58] Field of Search ........................ 429/194, 197, 224

[56] References Cited

U.S. PATENT DOCUMENTS

| | | | |
|---|---|---|---|
| 1,601,457 | 9/1926 | Smith | 429/224 |
| 4,264,689 | 4/1981 | Moses | 429/194 |
| 4,336,315 | 6/1982 | Eda et al. | 429/194 |

FOREIGN PATENT DOCUMENTS

| | | |
|---|---|---|
| 541826 | 6/1977 | Japan . |
| 53-58622 | 5/1978 | Japan . |
| 564188 | 5/1978 | Japan . |
| 53-74243 | 7/1978 | Japan . |
| 54-738 | 1/1979 | Japan . |
| 56-143664 | 11/1981 | Japan . |
| 57-50768 | 3/1982 | Japan . |
| 57-28457 | 6/1982 | Japan . |

*Primary Examiner*—Donald L. Walton
*Attorney, Agent, or Firm*—Cornelius F. O'Brien

[57] ABSTRACT

A nonaqueous cell employing a manganese dioxide-containing solid cathode having a minor amount of an alkali metal or an alkaline earth metal additive such as $Li_2SiO_3$, $Li_2B_4O_7$, $Li_2MoO_4$, $Li_3PO_4$ or $Li_2WO_4$ to suppress the build-up of internal impedance in the cell during storage and discharge that may occur with electrolyte degradation.

10 Claims, No Drawings

ALKALI METAL OR ALKALINE EARTH METAL COMPOUND ADDITIVE FOR MANGANESE DIOXIDE-CONTAINING NONAQUEOUS CELLS

FIELD OF THE INVENTION

The invention relates to a nonaqueous cell utilizing an active metal anode, a nonaqueous electrolyte solution based on an organic solvent and a manganese dioxide-containing solid cathode containing a minor amount of an additive selected from the group consisting of the borates, silicates, molybdates, phosphates, aluminates, niobates, tantalates, titanates, vanadates, zirconates, manganates (Mn +4), cobaltates and tungstates of alkali metals or alkaline earth metals wherein the alkali metal is selected from the group consisting of lithium, potassium, rubidium and cesium and wherein the alkaline earth metal is selected from the group consisting of magnesium, calcium, barium, and strontium.

BACKGROUND OF THE ART

The development of high energy battery systems requires the compatibility of an electrolyte possessing desirable electrochemical properties with highly reactive anode materials, such as lithium, sodium and the like, and the efficient use of high energy density cathode materials, such as manganese dioxide. The use of aqueous electrolytes is precluded in these systems since the anode materials are sufficiently active to react with water chemically. It has, therefore, been necessary, in order to realize the high energy density obtainable through use of these highly reactive anodes and high energy density cathodes, to turn to the investigation of nonaqueous electrolyte systems and more particularly to nonaqueous electrolyte systems based on organic solvents.

The term "nonaqueous electrolyte" in the prior art refers to an electrolyte which is composed of a solute, for example, a salt or a complex salt of Group I-A, Group II-A or Group III-A elements of the Periodic Table, dissolved in an appropriate nonaqueous organic solvent. Conventional solvents include propylene carbonate, ethylene carbonate or $\gamma$-(gamma)butyrolactone. The term "Periodic Table" as used herein refers to the Periodic Table of the Elements as set forth on the inside front cover of the Handbook of Chemistry and Physics, 63rd Edition, CRC Press Inc., Boca Raton, Fla., 1982-1983.

Although manganese dioxide has been mentioned as a cathode for cell applications, manganese dioxide inherently contains an unacceptable amount of water, both of the adsorbed and bound (absorbed) types, which is sufficient to cause anode (lithium) corrosion along with its associated hydrogen evolution. This type of corrosion that causes gas evolution is a serious problem in sealed cells, particularly in miniature type button cells. In order to maintain battery-powered electronic devices as compact as possible, the electronic devices are usually designed with cavities to accommodate the miniature cells as their power source. The cavities are usually made so that a cell can be snugly positioned therein thus making electronic contact with appropriate terminals within the device. A major potential problem in the use of cell-powered devices of this nature is that if the gas evolution causes the cell to bulge then the cell could become wedged within the cavity. This could result in damage to the device. Also, if electrolyte leaks from the cell it could cause damage to the device. It is therefore important that the physical dimensions of the cell's housing remain constant during discharge and that the cell will not leak any electrolyte into the device being powered.

In order to reduce the water content in manganese dioxide, several processes have been developed. For example, U.S. Pat. No. 4,133,856 discloses a process for producing an $MnO_2$ electrode (cathode) for nonaqueous cells whereby the $MnO_2$ is initially heated within a range of 350° C. to 430° C. so as to substantially remove both the adsorbed and bound water and then, after being formed into an electrode with a conductive agent and binder, it is further heated in a range of 200° C. to 350° C. prior to its assembly into a cell. British Pat. No. 1,199,426 also discloses the heat treatment of $MnO_2$ in air at 250° C. to 450° C. to substantially remove its water component.

U.S. Pat. No. 4,285,122 discloses a process whereby a homogeneous mass of particulate manganese dioxide is heat-treated and then contacted with an organic solvent that substantially fills the pores of the manganese dioxide with a layer of the organic solvent which effectively decreases the affinity or propensity of the manganese dioxide for readsorbing moisture.

U.S. Pat. No. 4,379,817 discloses a process whereby the walls of the pores of manganese dioxide are coated by vapor-depositing an organic solvent thereon to reduce the manganese dioxide's affinity for adsorbing moisture when exposed to a moisture-containing environment for a fixed time period.

Although manganese dioxide with reduced water content is better suited for nonaqueous cell systems, it was noted that cells employing this type of active material had a tendency to show increased internal impedance during storage. This condition is accompanied by poor closed circuit voltage, poor high and low temperature shelf life, poor cell voltage maintenance characteristics, and poor pulse rate and discharge capabilities.

U.S. patent application Ser. No. 447,106 filed Dec. 6, 1982 discloses a nonaqueous cell employing a solid cathode comprising manganese dioxide, a binder, a conductive agent and at least one compound selected from the group consisting of alkaline earth metal hydroxides such as $Mg(OH)_2$, $Ca(OH)_2$, $Ba(OH)_2$ and $Sr(OH)_2$ and alkaline earth metal carbonates, such as $MgCO_3$, $CaCO_3$, $BaCO_3$ and $SrCO_3$ to suppress or minimize the increase in the internal impedance of the cell which may occur during storage or discharge.

It is an object of the present invention to provide a new class of additives for manganese dioxide-containing cathodes intended for use in nonaqueous cells that will suppress or minimize the increase in the internal impedance of the cell which may occur during storage or discharge.

Another object of the present invention is to provide a nonaqueous cell employing among other components a manganese dioxide-containing solid cathode having a minor amount of an additive such as lithium metasilicate ($Li_2SiO_3$), lithium tetraborate ($Li_2B_4O_7$), lithium molybdate ($Li_2MoO_4$) or lithium orthophosphate ($Li_3PO_4$) to improve the voltage maintenance and pulse discharge characteristics of the cell even after prolonged storage.

The foregoing and additional objects will become more fully apparent from the following description.

DISCLOSURE OF THE INVENTION

The invention relates to a nonaqueous cell comprising an active metal anode, a nonaqueous electrolyte solution based on at least one organic solvent and a solid cathode comprising manganese dioxide, a binder and a conductive agent; the improvement wherein the cathode contains a minor amount of an additive selected from the group consisting of the borates, silicates, molybdates, phosphates, aluminates, niobates, tantalates, titanates, vanadates, zirconates, manganates (Mn +4), cobaltates, and tungstates of alkali metals or alkaline earth metals wherein the alkali metal is selected from the group consisting of lithium, potassium, rubidium and cesium, and wherein the alkaline earth metal is selected from the group consisting of magnesium, calcium, strontium and barium.

Suitable additives for use in this invention would include lithium metasilicate ($Li_2SiO_3$), lithium tetraborate ($Li_2B_4O_7$), lithium molybdate ($Li_2MoO_4$), lithium orthophosphate ($Li_3PO_4$), lithium orthosilicate ($Li_4SiO_4$), lithium metaborate ($LiBO_2$), lithium tungstate ($Li_2WO_4$), lithium niobate ($LiNbO_3$), lithium tantalate ($LiTaO_3$), lithium zirconate ($Li_2ZrO_3$), lithium metavanadate ($LiVO_3$), lithium titanate ($Li_2TiO_3$) and lithium aluminate ($LiAlO_2$). The preferred additives would be lithium metasilicate, lithium tetraborate, lithium orthophosphate, lithium molybdate and lithium tungstate.

Although not wishing to be held to any theory, it is believed that electrolyte degradation occurs in $MnO_2$-containing nonaqueous cells due to the reaction of surface acidic groups on the $MnO_2$ with the organic solvent of the electrolyte. Also, the use of incompletely neutralized salts in preparing the electrolyte solution may also introduce acidic impurities. Moreover, because of the relatively high solubility of these compounds in nonaqueous electrolytes, the addition of the selected additive of this invention is believed to react with the acidic impurities in the cell to neutralize them. This addition to the cell's cathode will effectively suppress build-up of internal impedance of the cell which could be caused by electrolyte degradation.

The selected additive of this invention should be incorporated in the $MnO_2$-containing cathode by an amount between about 0.05 and about 10 weight percent based on the dry weight of the cathode, preferably, between about 0.1 and about 5 weight percent and more preferably about 1 to about 4 weight percent. An amount of the additive below (0.05) weight percent will not provide sufficient basicity to effectively neutralize acidic impurities in the cell for the reason discussed above. An amount of the additive above 10 weight percent would generally provide needless excess of basicity for neutralizing the acidic impurities for most cell applications while also decreasing the volume available for the active cathode material for given size cells. It will be appreciated that the range of the additive will also depend upon the basicity of the additive selected and the type of manganese dioxide employed. Of the additives suitable for this invention, $Li_2SiO_3$, $Li_2B_4O_7$, $Li_2MoO_4$, $Li_3PO_4$, and $Li_2WO_4$ are the preferred, with $Li_2SiO_3$ being the most preferred.

The alkaline earth metal compound or alkali metal compound additive can be blended directly with the dry cathode mix or it can be added during the aqueous processing of the wet cathode mix. The dry mix is then molded into cathode pellets using conventional techniques.

The water inherently contained in both the electrolytic and chemical types of manganese dioxide can be substantially removed by various treatments. For example, the manganese dioxide can be heated in air or an inert atmosphere at a temperature of 350° C. for about 8 hours or at a lower temperature for a longer period of time. Care should be taken to avoid heating the manganese dioxide above its decomposition temperature which is about 400° C. in air. In oxygen atmospheres, higher temperatures may be employed.

Preferably, the manganese dioxide should be heat-treated to remove its water content in the crystal lattice to below about 1 weight percent and then it can be mixed with a conductive agent such as graphite, carbon or the like and a binder such a Teflon (trademark for polytetrafluoroethylene), ethylene acrylic acid copolymer or the like to produce a solid cathode. If desired, a small amount of the electrolyte can be incorporated into the manganese dioxide mix.

An added possible benefit in the removal of substantially all the water from manganese dioxide is that if small amounts of water are present in the cell's electrolyte then the manganese dioxide will adsorb the main portion of that water from the electrolyte and thereby prevent or substantially delay the reaction of the water with the anode such as lithium. In this situation, the manganese dioxide will act as an extracting agent for the water impurities in the organic solvents.

Useful highly active metal anode materials include aluminum, the alkali metals, alkaline earth metals and alloys of alkali metals or alkaline earth metals with each other and other metals. The term "alloy" as used herein and in the appended claims is intended to include mixtures, solid solutions, such as lithium-magnesium, and intermetallic compounds, such as lithium monoaluminide. The preferred anode materials are lithium, sodium, potassium, magnesium, calcium and alloys thereof.

Useful organic solvents employed alone or mixed with one or more other solvents for use in this invention include the following classes of compounds:

Alkylene nitriles: e.g., crotonitrile (liquid range, −51.1° C. to 120° C.)
Trialkyl borates: e.g., trimethyl borate,

(liquid range, −29.3° to 67° C.)
Tetraalkyl silicates: e.g., tetramethyl silicate,

(boiling point, 121° C.)
Nitroalkanes: e.g., nitromethane,

(liquid range, −17° to 100.8° C.)
Alkylnitriles: e.g., acetonitrile,

(liquid range, −45° to 81.6° C.)
Dialkylamides: e.g., dimethylformamide,

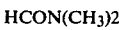

(liquid range, −60.48° to 149° C.)
Lactams: e.g., N-methypyrrolidone,

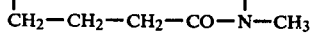

(liquid range, −16° to 202° C.)
Tetraalkylureas: e.g., tetramethylurea, (CH$_3$)$_2$N—CO—N(CH$_3$)$_2$ (liquid range, −1.2° to 166° C.)
Monocarboxylic acid esters: e.g., ethyl acetate (liquid range, −83.6° to 77.06° C.)
Orthoesters: e.g., trimethylorthoformate,

HC(OCH$_3$)$_3$ (boiling point, 103° C.)
Lactones: e.g., γ (gamma)-butyrolactone,

(liquid range, −42° to 206° C.)
Dialkyl carbonates: e.g., dimethyl carbonate,

OC(OCH$_3$)$_2$ (liquid range, 2° to 90° C.)
Alkylene carbonates: e.g., propylene carbonate,

(liquid range, −48° to 242° C.)
Monoethers: e.g., diethyl ether (liquid range, −116° to 34.5° C.)
Polyethers: e.g., 1,1- and 1,2-dimethoxyethane (liquid ranges, −113.2° to 64.5° C. and 31 58° to 83° C., respectively)
Cyclic ethers: e.g., tetrahydrofuran (liquid range, −65° to 67° C.); 1,3-dioxolane (liquid range, −95° to 78° C.)
Nitroaromatics: e.g., nitrobenzene (liquid range, 5.7° to 210° C.)
Aromatic carboxylic acid halides: e.g., benzoyl chloride (liquid range, 0° to 197° C.); benzoyl bromide (liquid range, −24° to 218° C.)
Aromatic sulfonic acid halides: e.g., benzene sulfonyl chloride (liquid range, 14.5° to 251° C.)
Aromatic phosphonic acid dihalides: e.g., benzene phosphonyl dichloride (boiling point, 258° C.)
Aromatic thiophosphonic acid dihalides: e.g., benzene thiophosphonyl dichloride (boiling point, 124° C. at 5 mm)
Cyclic sulfones: e.g., sulfolane,

(melting point, 22° C.); 3-methylsulfolane (melting point, −1° C.)
Alkyl sulfonic acid halides: e.g., methanesulfonyl chloride (boiling point, 161° C.)
Alkyl carboxylic acid halides: e.g., acetyl chloride (liquid range, −112° to 50.9° C.); acetyl bromide (liquid range, −96° to 76° C.); propionyl chloride (liquid range, −94° to 80° C.)
Saturated heterocyclics: e.g., tetrahydrothiophene (liquid range, −96° to 121° C.); 3-methyl-2-oxazolidone (melting point, 15.9° C.)
Dialkyl sulfamic acid halides: e.g., dimethyl sulfamyl chloride (boiling point, 80° C. at 16 mm)
Alkyl halosulfonates: e.g., ethyl chlorosulfonate (boiling point, 151° C.)
Unsaturated heterocyclic carboxylic acid halides: e.g., 2-furoyl chloride (liquid range, −2° to 173° C.)
Five-membered unsaturated heterocyclics: e.g., 3,5-dimethylisoxazole (boiling point, 140° C.); 1-methylpyrrole (boiling point, 114° C.); 2,4-dimethylthiazole (boiling point, 144° C.); furan (liquid range, −85.65° to 31.36° C.)
Esters and/or halides of dibasic carboxylic acids: e.g., ethyl oxalyl chloride (boiling point, 135° C.)
Mixed alkyl sulfonic acid halides and carboxylic acid halides: e.g., chlorosulfonyl acetyl chloride (boiling point, 98° C. at 10 mm)
Dialkyl sulfoxides: e.g., dimethyl sulfoxide (liquid range, 18.4° to 189° C.)
Dialkyl sulfates: e.g., dimethylsulfate (liquid range, −31.75° to 188.5° C.)
Dialkyl sulfites: e.g., dimethylsulfite (boiling point, 126° C.)
Alkylene sulfites: e.g., ethylene glycol sulfite (liquid range, −11° to 173° C.)
Halogenated alkanes: e.g., methylene chloride (liquid range, −95° to 40° C.); 1,3-dichloropropane (liquid range, −99.5° to 120.4° C.)

The preferred solvents are sulfolane; tetrahydrofuran; methyl-substituted tetrahydrofuran; 1,3-dioxolane; 3-methyl-2-oxazolidone, propylene carbonate; γ (gamma)-butyrolactone; ethylene glycol sulfite; dimethylsulfite; dimethyl sulfoxide; and 1,1- and 1,2-dimethoxyethane. Of the preferred solvents, the best are sulfolane; 3-methyl-2-oxazolidone; propylene carbonate; 1,1- and 1,2-dimethoxyethane, and 1,3-dioxolane because they appear more chemically inert to battery components and have wide liquid ranges, and especially because they permit highly efficient utilization of the cathode materials.

Low viscosity cosolvents which can be used include tetrahydrofuran (THF), methyl-substituted tetrahydrofuran (Me-THF), dioxolane (DIOX), dimethoxyethane (DME), dimethyl isoxazole (DMI), diethyl carbonate (DEC), ethylene glycol sulfite (EGS), dioxane, dimethyl sulfite (DMS) or the like. Specifically, the total amount of the low viscosity cosolvent added could be between about 20% and about 80% based on total solvent volume, i.e., exclusive of solute, so as to lower the viscosity to a level suitable for use in a high drain cell.

The ionizing solute for use in the invention may be a simple or double salt or mixtures thereof, for example, LiCF$_3$SO$_3$, LiBF$_4$ and LiClO$_4$ which will produce an ionically conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226-July/December, 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron The voltages were recorded with time to a 2.0 volt cutoff, for both the background load and the pulse discharge load. The average voltage of three cells recorded at half the time period (Mid-Life, Fresh) for the pulse load discharge is shown in Table 1.

The above two tests were repeated for cells stored at 60° C. for 40 days and the data calculated (Initial Volts, Stored and Mid-Life, Stored) are shown in Table 1.

For the above test, the average milliampere hour (mAh) outputs to 2.0 volts (background and pulse loads) for three fresh cells of each type were also calculated and are shown in Table 1. The same data for cells that were stored at 60° C. for 40 days are shown in Table 1.

TABLE 1

| Sample Cells | Additive | Initial Volts | | Mid-Life | | Discharge Capacity (mAh) to 2.0 V | | | |
|---|---|---|---|---|---|---|---|---|---|
| | | Fresh (volt) | Stored (volt) | Fresh (volt) | Stored (volt) | *Background Load | | **Pulse Load | |
| | | | | | | Fresh | Stored | Fresh | Stored |
| A | $Li_2SiO_3$ | 2.99 | 2.72 | 2.54 | 2.56 | 80 | 81 | 69 | 54 |
| B | $Li_2B_4O_7$ | 3.07 | 2.59 | 2.63 | 2.63 | 81 | 80 | 67 | 57 |
| C | $Li_2MoO_4$ | 3.05 | 2.54 | 2.67 | 2.50 | 80 | 80 | 65 | 51 |
| D | NONE | 2.94 | 2.48 | 2.58 | 2.31 | 83 | 69 | 62 | 44 |
| E | $LiBO_2$ | 3.09 | 2.44 | 2.61 | 2.56 | 83 | 78 | 69 | 52 |
| F | $LiAlO_2$ | 3.01 | 2.42 | 2.55 | 2.30 | 81 | 74 | 63 | 44 |
| G | $Li_3PO_4$ | 3.04 | 2.39 | 2.59 | 2.39 | 80 | 76 | 63 | 47 |
| H | $LiNbO_3$ | 2.65 | 2.15 | 2.13 | 2.37 | 83 | 77 | 55 | 52 |

*to 2.0 volt cutoff on 30-K ohm background load.
**to 2.0 volt cutoff on 400-ohm pulse load.

fluoride, boron chloride, boron bromide, phosphorous pentafluoride, arsenic pentafluoride and antimony pentafluoride.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride.

EXAMPLE 1

Several miniature cells having a nominal 0.785 inch (20 mm) diameter and nominal 0.063 inch (1.6 mm) height were constructed to demonstrate the beneficial effect of the additives of this invention. Each cell contained 0.022 gram lithium as the anode; 0.36 gram of a cathode mix containing 93 weight percent $MnO_2$, 3 weight percent acetylene black, 3 weight percent polytetrafluoroethylene with 1 weight percent of the selected additive shown in Table 1; and about 0.092 milliliters of an electrolyte consisting of about 50 volume percent propylene carbonate, 50 volume percent dimethoxyethane (DME) and containing 1M $LiCF_3SO_3$. Additional miniature cells were constructed as above except that they did not contain any additive.

The closed circuit voltages (Initial Volts, Fresh) of three cells of each type were observed 2 seconds after initiation of a 400-ohm discharge load. The average of the three cells was calculated and the results are shown in Table I.

Three cells of each type were then discharged across a 30K-ohm load with a superimposed 400-ohm pulse load (once per day, 3 days per week, for two seconds).

EXAMPLE 2

Several miniature cells were produced as in Example 1 with or without an additive as shown in Table 2. Fresh cells were stored at −10° C. for 4 hours and then discharged across a 400-ohm pulse load for two seconds. The average closed circuit voltage (fresh) at 2 seconds observed for three cells of each type is shown in Table 2. The cells were then continuously discharged across a 30K-ohm load at 21° C. for 11 days afterwhich they were stored at −10° C. for four hours. The cells were then discharged across a 400-ohm pulse load for 2 seconds and the average closed circuit voltage at 2 seconds was calculated for three cells of each type. The results obtained (11 days) are shown in Table 2. The cells were then continuously discharged across a 30K-ohm load at 21° C. for an additional 11 days after which they were stored at −10° C. for four hours. The cells were then discharged across a 400-ohm pulse load for 2 seconds and the average closed circuit voltage at 2 seconds was calculated for three cells of each type. The result obtained (22 days) are shown in Table 2.

TABLE 2

| Cell Sample | Additive | Pulse Voltage (volts) | | |
|---|---|---|---|---|
| | | Fresh | 11 Days | 22 Days |
| A | $Li_2SiO_3$ | 2.77 | 2.30 | 2.08 |
| B | $Li_2B_4O_7$ | 2.84 | 2.36 | 2.06 |
| C | $Li_2MoO_4$ | 2.84 | 2.39 | 2.15 |
| D | None | 2.55 | 2.24 | 1.89 |
| E | $LiBO_2$ | 2.81 | 2.36 | 2.05 |
| F | $LiAlO_2$ | 2.78 | 2.39 | 1.99 |
| G | $Li_3PO_4$ | 2.76 | 2.25 | 1.96 |
| H | $LiNbO_3$ | 2.00 | 2.09 | 1.97 |

The data observed from Examples 1 and 2 demonstrate that the additives of this invention can improve voltage maintenance, discharge capacity and −10° C. pulse voltage for $MnO_2$-containing cells.

EXAMPLE 3

Several cylindrical cells having a 0.456 inch (1.16 cm) diameter and a 0.420 inch (1.07 cm) height were constructed with each employing a cathode made up of a 0.88 gram mix containing 89 weight percent $MnO_2$, 4 weight percent graphite, 3 weight percent polytetrafluoroethylene, and 4 weight percent $Li_2SiO_3$; a 0.063 gram lithium anode; a separator; and about 300 milliliters of an electrolyte consisting of about 50 volume percent of propylene carbonate, about 50 volume percent of dimethoxyethane, and containing 1M $LiCF_3SO_3$. Additional control cells were constructed in an identical fashion except that $Li_2SiO_3$ was not added.

The cells were continuously discharged across a 50-ohm or 1K-ohm load at room temperature (21° C.) or at −20° C. to a 2.0 volt cutoff. The data obtained are shown in Table 3.

Additional cells were stored at −20° C. for at least one hour and then intermittently discharged across a 50-ohm load to a 1.5 volt cutoff. This intermittent test consisted of applying the load for two seconds followed by a one-second rest period. The number of pulse cycles observed to a 1.5 volt cutoff is shown in Table 4.

TABLE 3

| Cell Sample | Additive | Storage | 50 Ohm (time) | 1K (time) | 1K at −20° C. (time) |
|---|---|---|---|---|---|
| A | None | Fresh | 141 min. | 64 hrs. | 46 hrs. |
| B | $Li_2SiO_3$ | " | 134 min. | 70 hrs. | 60 hrs. |
| C | *None | 20 days at 60° C. | 60 min. | 42 hrs. | |
| D | $Li_2SiO_3$ | 20 days at 60° C. | 111 min. | 64 hrs. | |
| E | *None | 40 days at 60° C. | 0 | 11 hrs. | |
| F | $Li_2SiO_3$ | 40 days at 60° C. | 121 min. | — | |
| G | *None | 60 days at 60° C. | 0 | 0 | |
| H | $Li_2SiO_3$ | 60 days at 60° C. | 114 min. | 63 hrs. | |

*These cells contained 0.90 gram of the cathode mix.

TABLE 4

| Cell Sample | Additive | Storage | Intermittent Discharge at −20° C. Cycle |
|---|---|---|---|
| A | None | Fresh | 292 |
| B | $Li_2SiO_3$ | " | 2117 |
| C | $Li_2SiO_3$ | 20 days at 60° C. | 1892 |

As evident from the data, the $Li_2SiO_3$ additive provided a substantial service advantage after 60° C. storage when the cells were discharged at room temperature (21° C.) and at −20° C. At −20° C., the fresh cells containing the $Li_2SiO_3$ additive delivered an average of about 2117 cycles on the 50-ohm intermittent test regime compared to an average of about only 292 cycles for cells that did not contain any additive.

EXAMPLE 4

Several cylindrical cells were constructed as in Example 3 and their impedance values at 1 KHz were measured and are shown in Table 5.

TABLE 5

| Cell Sample | Additive | Storage | Impedance |
|---|---|---|---|
| A | None | Fresh | 6.9 ohms |
| B | $Li_2SiO_3$ | " | 4.1 ohms |
| C | None | 20 days at 60° C. | 32.9 ohms |
| D | $Li_2SiO_3$ | 20 days at 60° C. | 10.3 ohms |
| E | $Li_2SiO_3$ | 40 days at 60° C. | 7.9 ohms |
| F | $Li_2SiO_3$ | 60 days at 60° C. | 18.5 ohms |

What is claimed is:

1. A nonaqueous cell comprising an active metal anode, a nonaqueous electrolyte solution comprising a solute dissolved in at least one organic solvent, and a solid cathode comprising manganese dioxide, a binder and a conductive agent; the improvement wherein the cathode contains a minor amount of an additive selected from the group consisting of the borates, silicates, molybdates, phosphates, aluminates, niobates, tantalates, titanates, vanadates, zirconates, manganates (Mn +4), cobaltates, and tungstates of alkali metals or alkaline earth metals wherein the alkali metal is selected from the group consisting of lithium, potassium, rubidium and cesium and wherein the alkaline earth metal is selected from the group consisting of magnesium, calcium, strontium, and barium.

2. The nonaqueous cell of claim 1 wherein the additive in the cathode is present in an amount between about 0.05 weight percent and about 10 weight percent based on the dry weight of the cathode.

3. The nonaqueous cell of claim 2 wherein the additive is present in an amount between about 0.1 weight percent and about 5 weight percent based on the dry weight of the cathode.

4. The nonaqueous cell of claim 2 wherein the additive is selected from the group consisting of lithium metasilicate, lithium tetraborate, lithium molybdate, lithium orthophosphate, and lithium tungstate.

5. The nonaqueous cell of claim 4 wherein the additive is lithium metasilicate.

6. The nonaqueous cell of claim 4 wherein the additive is lithium tungstate.

7. The nonaqueous cell of claim 4 wherein the conductive agent is a carbonaceous material.

8. The nonaqueous cell of claim 4 wherein the binder is polytetrafluoroethylene or ethylene acrylic acid copolymer.

9. The nonaqueous cell of claim 4 wherein said active metal anode is selected from the group consisting of lithium, sodium, potassium, magnesium, calcium, aluminum and alloys thereof.

10. The nonaqueous cell of claim 4 wherein said active metal anode is lithium.

* * * * *